United States Patent
Soryal

(10) Patent No.: US 12,075,242 B2
(45) Date of Patent: *Aug. 27, 2024

(54) FACILITATION OF AUTHENTICATION MANAGEMENT FOR AUTONOMOUS VEHICLES

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/045,641

(22) Filed: Oct. 11, 2022

(65) Prior Publication Data

US 2023/0057641 A1   Feb. 23, 2023

Related U.S. Application Data

(63) Continuation of application No. 16/366,521, filed on Mar. 27, 2019, now Pat. No. 11,496,895.

(51) Int. Cl.
*H04W 12/06* (2021.01)
*H04W 4/02* (2018.01)
*H04W 4/44* (2018.01)
*H04W 76/10* (2018.01)

(52) U.S. Cl.
CPC .......... *H04W 12/06* (2013.01); *H04W 4/026* (2013.01); *H04W 4/027* (2013.01); *H04W 4/44* (2018.02); *H04W 76/10* (2018.02)

(58) Field of Classification Search
CPC ............. H04W 12/06; H04W 36/0003; H04W 36/005; H04W 36/36; H04W 4/026; H04W 4/027; H04W 4/44; H04W 76/10
See application file for complete search history.

(56) References Cited

U.S. PATENT DOCUMENTS

| | | | |
|---|---|---|---|
| 10,885,780 B1 | 1/2021 | Bseileh et al. | |
| 11,166,206 B2 * | 11/2021 | Crawford | .............. H04L 9/0643 |
| 11,330,412 B2 * | 5/2022 | Nishizaki | ................ G01S 19/42 |
| 11,388,719 B2 * | 7/2022 | Sharma | ................. H04B 7/043 |

(Continued)

OTHER PUBLICATIONS

"V2X / C2X Certificates", Integrity Security Services, https://www.ghsiss.com/v2x-certificates/, Last Accessed Jun. 18, 2019, 3 pages.

(Continued)

*Primary Examiner* — Khawar Iqbal
(74) *Attorney, Agent, or Firm* — Guntin & Gust, PLC; Matthew Tropper

(57) ABSTRACT

Secure communication for autonomous vehicles can be increased by performing authentication operations before nodes, such as vehicles, roadside equipment (RSE), or base stations, are within communications range. A digital certificate management system for mobile nodes, including for moving vehicles, can facilitate ultra fast communications between vehicles and other nodes. The RSE can propagate vehicle node data, comprising direction, speed, or estimated time of arrival, to other vehicles and/or other RSEs. Consequently, this propagation of data prior to the communication between nodes can facilitate an efficient authentication system.

20 Claims, 10 Drawing Sheets

(56) References Cited

U.S. PATENT DOCUMENTS

| | | | |
|---|---|---|---|
| 11,528,649 B2* | 12/2022 | Song | H04W 36/38 |
| 11,582,602 B2* | 2/2023 | Chen | H04W 12/06 |
| 2017/0219369 A1* | 8/2017 | Lei | G08G 1/096758 |
| 2017/0303175 A1* | 10/2017 | Chen | H04W 24/02 |
| 2018/0041898 A1* | 2/2018 | Hampel | H04W 74/0833 |
| 2020/0008027 A1 | 1/2020 | Yabuuchi et al. | |
| 2020/0128563 A1* | 4/2020 | Martin | H04W 72/23 |
| 2020/0150684 A1 | 5/2020 | Kim | |
| 2020/0228948 A1* | 7/2020 | Watfa | H04W 48/14 |
| 2020/0280842 A1* | 9/2020 | Liu | H04L 9/3268 |
| 2020/0336905 A1 | 10/2020 | Cho et al. | |
| 2020/0382325 A1* | 12/2020 | Simplicio, Jr. | H04L 63/0823 |
| 2020/0388156 A1 | 12/2020 | Aoude et al. | |
| 2020/0413294 A1 | 12/2020 | Condoluci et al. | |
| 2021/0337432 A1 | 10/2021 | Lee et al. | |
| 2022/0141042 A1* | 5/2022 | Ambrosin | H04L 9/3297 713/159 |
| 2022/0158853 A1 | 5/2022 | Simplicio et al. | |

OTHER PUBLICATIONS

"Automotive IoT Security Solutions", digicert, https://www.digicert.com/internet-of-things/automotive-cyber-security/, Last Accessed Jun. 19, 2019, 18 pages.

Malmstrom, "Nexus Helps Protect Connected and Autonomous Vehicles", Nexus, https://www.nexusgroup.com/blog/nexus-v2x-pki-plalform-enable-trust-for-connected-and-autonomous-vehicles/, Last Accessed, Jun. 19, 2019, 8 pages.

"UK Connected & Autonomous Vehicle Research & Development Projects 2018", Center for Connected & Autonomous Vehicles, Sep. 2018, 80 pages.

Walker et al., "Connected Vehicle Pilot Deployment Program", U.S. Department of Transportation, https://www.its.dot.gov/pilots/pdf/CVP_NYCDOTSystemDesignWebinar.pdf, Last Accessed Jun. 19, 2019, 52 pages.

"Security Credential Management System (SCMS)", U.S. Department of Transportation, https://www.its.dot.gov/resources/scms.htm, Last Accessed Jun. 19, 2019, 9 pages.

"SCMS CV Pilots Documentation", United States Department of Transportation, https://wiki.campllc.org/display/SCP, Last Accessed Jun. 19, 2019, 9 pages.

Non-Final Office Action received for U.S. Appl. No. 16/366,521 dated Jul. 2, 2021, 35 pages.

Final Office Action received for U.S. Appl. No. 16/366,521 dated Dec. 1, 2021, 58 pages.

Non-Final Office Action received for U.S. Appl. No. 16/366,521 dated Mar. 1, 2022, 53 pages.

Notice of Allowance received for U.S. Appl. No. 16/366,521 dated Jul. 6, 2022, 65 pages.

\* cited by examiner

FACILITATION OF AUTHENTICATION MANAGEMENT FOR AUTONOMOUS VEHICLES

RELATED APPLICATION

The subject patent application is a continuation of, and claims priority to, U.S. patent application Ser. No. 16/366,521, filed Mar. 27, 2019, and entitled "FACILITATION OF AUTHENTICATION MANAGEMENT FOR AUTONOMOUS VEHICLES," the entirety of which priority application is hereby incorporated by reference herein.

TECHNICAL FIELD

This disclosure relates generally to facilitating a network of autonomous vehicles. More specifically, this disclosure relates to facilitating authentication management for autonomous vehicles.

BACKGROUND

An automated driving system comprises complex combinations of various components that can be defined as systems where perception, decision making, and operation of an automobile are performed by electronics and machinery instead of a human driver. This includes handling of the vehicle, destination, as well as awareness of surroundings. While the automated system has control over the vehicle, it allows the human operator to leave all responsibilities to the system. The automated driving system is generally an integrated package of individual automated systems operating in concert. Automated driving implies that the driver has given the ability to drive (e.g., all appropriate monitoring, agency, and action functions' to the vehicle automation system. Even though the driver may be alert and ready to take action at any moment, they are still giving up the ability to the automation system.

Automated driving systems are often conditional, which implies that the automation system is capable of automated driving, but not for all conditions encountered in the course of normal operation. When the vehicle automation system has assumed all driving; functions, the human is no longer driving the vehicle but continues to assume responsibility for the vehicle's performance as the vehicle operator. The automated vehicle operator is not functionally required to actively monitor the vehicle's performance while the automation system is engaged, but the operator must be available to resume driving within several seconds of being prompted to do so, as the system has limited conditions of automation. While the automated driving system is engaged, certain conditions may prevent real-time human input. The operator is able to resume driving at any time subject to this short delay. When the operator has resumed all driving functions, he or she reassumes the status of the vehicle's driver.

The above-described background relating to a facilitating authentication management for autonomous vehicles is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
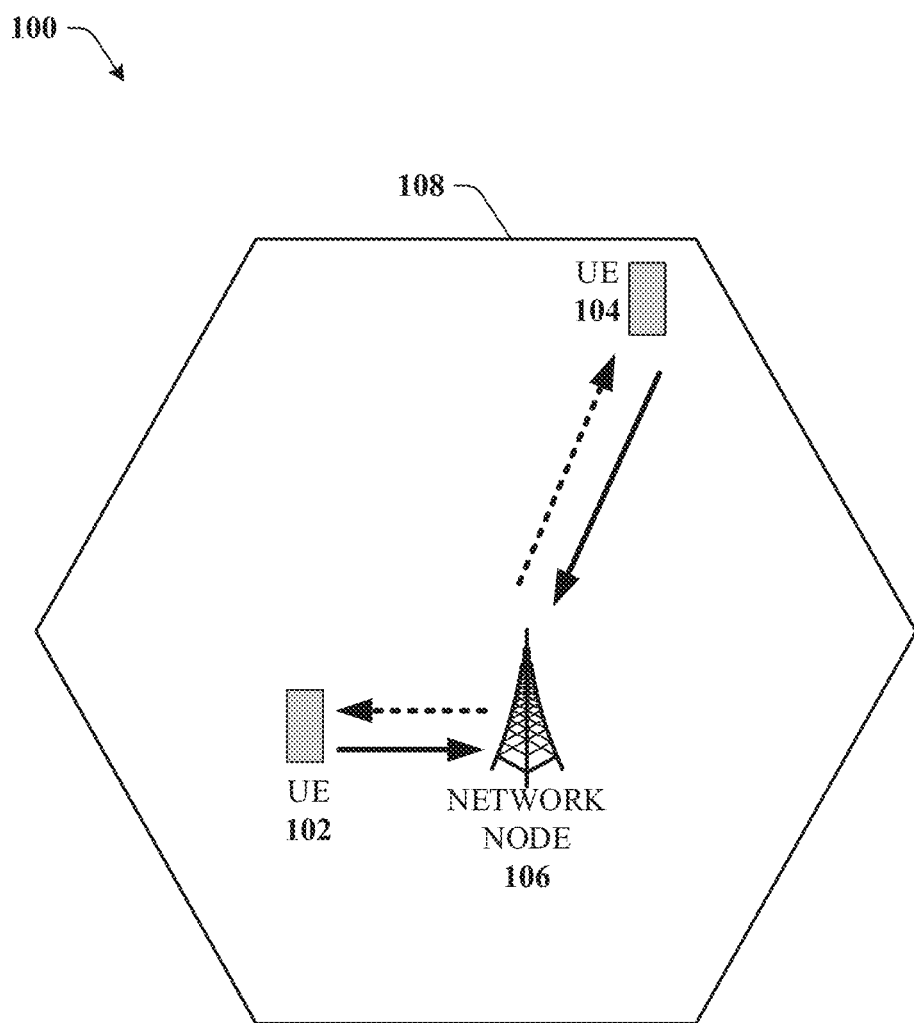
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate authentication management for autonomous vehicles.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate authentication management for autonomous vehicles. Facilitating authentication management for autonomous vehicles can be implemented in connection with any type of device with a connection to the communications network such as: a mobile handset, a computer, a handheld device, or the like.

Secure communication for autonomous vehicles can be increased by pre-performing an authentication step before the nodes (e.g., vehicles, base stations, roadside equipment, etc.) come within communication range of each other. Therefore another dimension for security can be added by facilitating multiple layers of authentication in a time efficient manner.

A digital certificate management system for mobile nodes, specifically for moving vehicles, can facilitate ultra fast communications between vehicles and other nodes (e.g., vehicles, roadside equipment (RSE), sensors, traffic controllers, and traffic management centers). In some embodiments, the RSE (e.g., cameras, radar detectors, microwave detectors, advanced traffic controller, closed caption television, communication equipment, any electronics with a fixed infrastructure that can communicate with the wireless infrastructure and the vehicles node) can propagate data (e.g., direction, speed, time of day, estimated time of arrival, etc.) to other vehicles and/or RSE. This data can be propagated based on speed, direction, messages from a node, street geometry, interfering objects, etc.

Timing can be a critical factor in sending/receiving safety related messages so that moving vehicles can take appropriate action in a timely manner (e.g., brake, avoid crashing, veer, increase speed, etc.). In current systems, vehicles can establish authentication with other nodes once the vehicles' come into the other nodes' communication range, which can waste time in the authentication process before actually exchanging information. Consequently, this delay can be fatal on the road.

Nodes can relay the authentication information of the communicating entities to the next fixed and/or unfixed mobile node. Thus, once the vehicle can be pre-authenticated by predicting the direction and estimated time of arrival of the vehicle node to save time. Consequently, there can be no wasted time for authentication at every single node (e.g., upcoming RSE, another vehicle, etc.). The solution can be built on the currently used transport layer security (TLS) certificates. Two potential scenarios are outlined below. In one scenario, a first node (e.g., node 1) and a second node (e.g., node 2) can authenticate each other and communicate (e.g., exchange safety messages, etc.). Node 2 can communicate with a third node (e.g., node 3), while, at the moment, node 1 cannot communicate with to node 3. However, if node 1 is moving towards node 2, then the system can predict (via direction, speed, history, traffic congestions, etc.) that node 1 will encounter (be in the wireless range of) node 3 shortly. Node 2 can predict that multiple nodes will be in the range of node 1. Node 2 can then authenticate node 3 and vice versa, prior to node 1 being in the range of node 3. Node 2 can also create and provide a new encryption key to node 1 and node 3. The transmission of the encryption key can be encrypted to only node 1 and node 3, so that they each receive the encryption key and each transmission can be performed with a different key (e.g., [node 1↔node 2] and [node 1↔node 3]. When node 1 reaches node 3, they can communicate directly without authentication because the authentication step was performed beforehand. In case the nodes use TLS certificates, then node 1 can provide node 2 with a public key for node 3, and can provide node 3 with a public key for node 2. Where there are multiple nodes, the original node can create a different key for each node.

In a TLS, a digital signature can be formed by encrypting a representation of a message. The encryption can use a private key of a certificate authority, and can decrypt it using the certificate authority public key to verify the digital signature. To validate the signature, a hash of the same data (e.g., the public key) can be calculated. The system can then decrypt the digital signature using the certificate authority's public key and compare two hash values of the system. Nodes can relay the authentication information of the communicating entities to the next mobile node so that once the vehicle is there, the vehicle has already been authenticated by predicting the direction and estimated time of arrival of the vehicle to save time. Thus, authentication time is preserved at the nodes (e.g., upcoming RSE, another vehicle, etc.).

The direction estimate or prediction can be based on a speed and/or velocity of the mobile device, the geometry of streets, and/or the direction of the traffic. For example, if a node realizes that the mobile device is moving too quickly to safely make a right or a left turn, then the node can predict that the only safe route for the mobile device to travel is in that of a straight path. Thus, the node device can relay the authentication data to the next available node (e.g., mobile, RSE, etc.) device that is on the route of that straight path. Alternatively, the estimate of the direction can be based on a traffic condition (e.g., high traffic, moderate traffic, low traffic, etc.) experienced by the vehicle node device. Also, in another embodiment, the node can explicitly declare its intended route/direction. The second node device can be mobile (e.g., vehicle) or fixed (e.g., RSE).

Consequently, one node (fixed or mobile) can communicate with many other nodes (fixed and/or mobile) on the route of a moving vehicle to provide authentication procedures for remote nodes, to the moving vehicle, by disseminating encryption keys. For example, it can be the same encryption key for each communication leg (e.g., key 1 for the moving vehicle and remote node 1; key 2 for the moving vehicle and remote node 2, etc.). The encryption keys can be exchanged and encrypted.

It should also be noted that an artificial intelligence (AI) component can facilitate automating one or more features in accordance with the disclosed aspects. A memory and a processor as well as other components can include functionality with regard to the figures. The disclosed aspects in connection with authentication management for autonomous vehicles can employ various AI-based schemes for carrying out various aspects thereof. For example, a process for detecting one or more trigger events, reducing a number of encryption keys a result of the one or more trigger events, and modifying one or more reported measurements, and so forth, can be facilitated with an example automatic classifier system and process. In another example, a process for penalizing one a node device while preferring another node device can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a vehicle route, modifying one or more reported encryption key transmissions, and so forth. The criteria can include, but is not limited to, predefined values, frequency attenuation tables or other parameters, service provider preferences and/or policies, and so on.

In one embodiment, described herein is a method comprising receiving, by a first node device comprising a processor, authentication data to facilitate a first wireless connection between a mobile device and the first node device. In response to the receiving the authentication data, the method can comprise generating, by the first node device, estimation data representative of an estimate of a direction of the mobile device. Based on the estimation data, the method can comprise transmitting, by the first node device, the authentication data to a second node device, resulting in transmission data, to facilitate a second wireless connection between the mobile device and the second node device.

According to another embodiment, a first vehicle node device can facilitate receiving authentication data from a second vehicle node device to facilitate a first wireless connection between the second vehicle node device and a stationary node device. In response to the receiving the authentication data, the first vehicle node device can facilitate generating estimation data representative of an estimate of a direction of the second node vehicle device. The first vehicle node device can comprise establishing a second wireless connection between the first vehicle node device and the stationary node device. Additionally, in response to the establishing the second wireless connection and based on the estimation data, the first vehicle node device can comprise transmitting the authentication data to the stationary node device to facilitate a third wireless connection between the second vehicle node device and the stationary node device.

According to yet another embodiment, described herein is a machine-readable storage medium that can perform the operations comprising receiving authentication data to facilitate a first wireless connection between a first vehicle and a second vehicle. The machine-readable storage medium can perform the operations comprising, generating estimation data representative of an estimate of a direction of the first vehicle in response to the receiving the authentication data. Additionally, based on the estimation data, the machine-readable storage medium can perform the operations comprising facilitating transmitting the authentication data to a third vehicle to facilitate a second wireless connection between the third vehicle and the first vehicle.

These and other embodiments or implementations are described in more detail below with reference to the drawings.

FIG. 1 illustrates an example wireless communication system in which a network node device (e.g., network node) and user equipment (UE) can implement various aspects and embodiments of the subject disclosure. Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
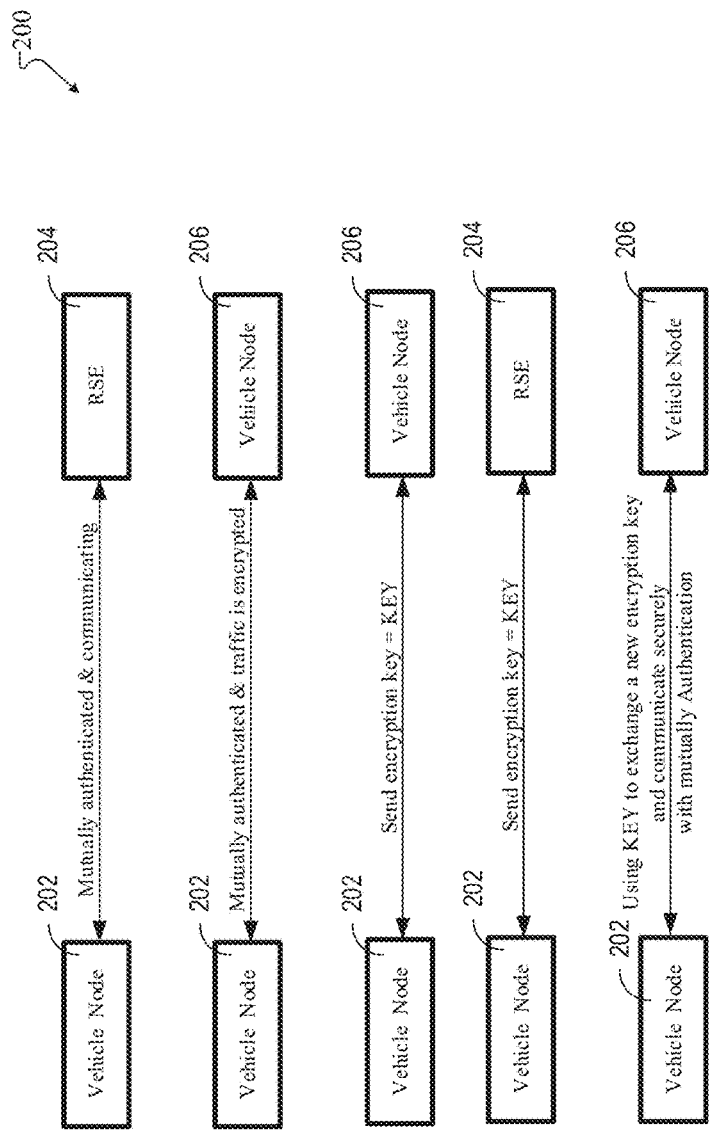
FIG. 2 illustrates an example node communication sequencing according to one or more embodiments.

Referring now to FIG. 2, illustrated is an example node communication sequencing 200 according to one or more embodiments. Within the node communication sequencing 200, a vehicle node 202 can communicate with an RSE node 204, via mutually authenticated communication channel. Additionally, a channel between the vehicle node 202 and another vehicle node 206 can be mutually authenticated to send encrypted traffic from the vehicle node 202 to the vehicle node 206. Thereafter, the vehicle node 202 can transmit an encryption key to the vehicle node 206, whereby the vehicle node 206 can then use the encryption key to exchange a new encryption key and communicate securely via the mutual authentication. The vehicle node 202 can also send an encryption key, different than the encryption key sent to the vehicle node 206, to the RSE 202. It should be noted that the depicted sequencing is not necessarily static and that other sequencing orders are possible.

Figure 3:
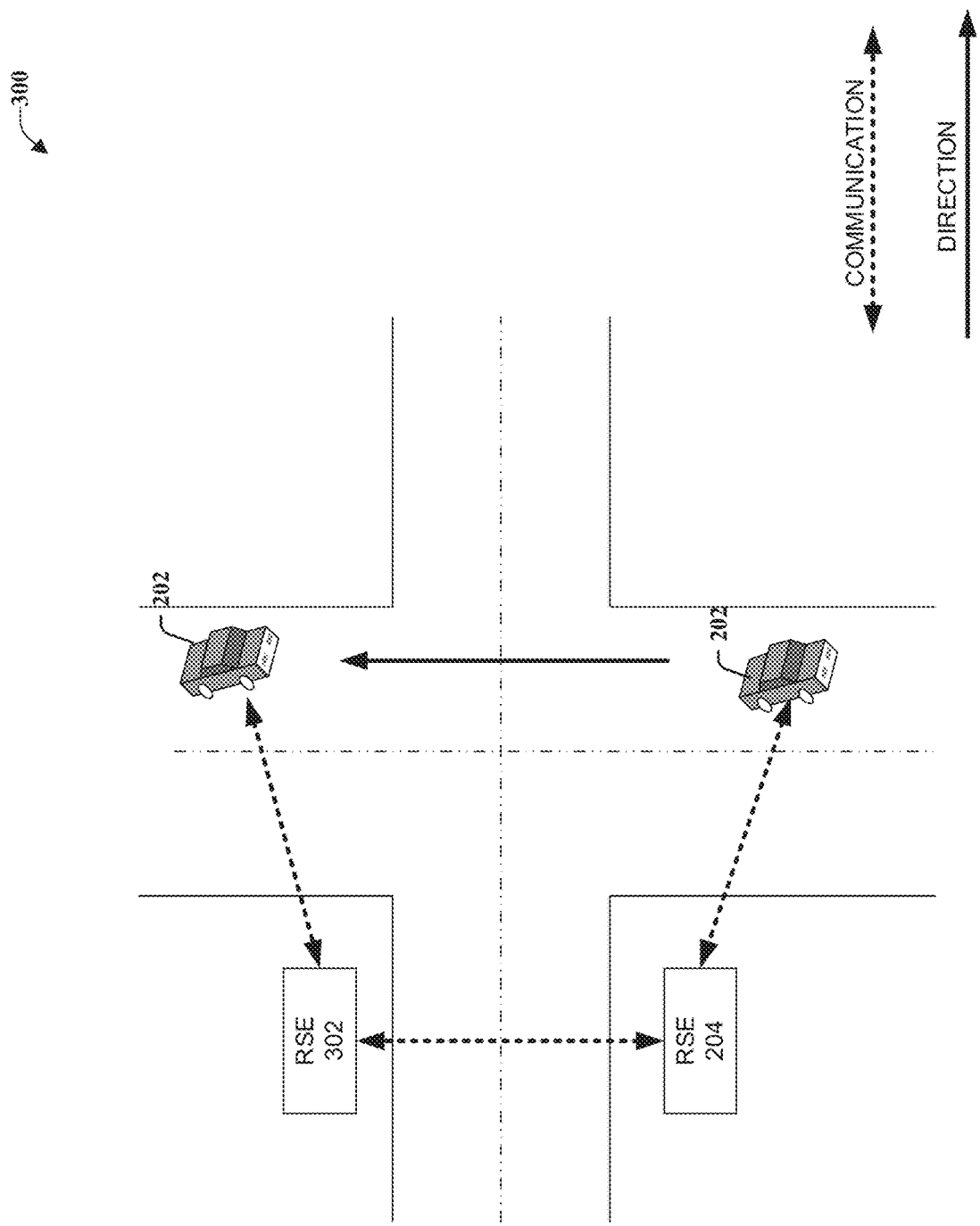
FIG. 3 illustrates an example authentication management system according to one or more embodiments.

Referring now to FIG. 3, illustrated is an example authentication management system 300 according to one or more embodiments. Initial communication between the vehicle node 202 and the RSE 204 can comprise 2-way authentication (e.g., TLS) handshake, whereby a verification process can take place between the vehicle node 202 and the RSE 204, each with its own digital certificate. To reduce the authentication time between the vehicle node 202 and an RSE 302, when the vehicle node 202 is in the service range of the RSE 302, the RSE 204 can provide the RSE 302 with information regarding the authentication of the vehicle node 202, before the vehicle node 202 reaches the coverage area of the RSE 302. Thus, the vehicle node 202 can begin communicating the RSE 302 right away because the RSE 204 knew that the RSE 302 was a next probable hub that would be encountered by the vehicle node 202. This information can be generated by measuring the vehicle node's 202 direction and/or speed in addition to street information (e.g., geometry, etc.). In case there are multiple routes available for the vehicle node 202, multiple potential RSEs, and/or other vehicles, then the RSE 204 can notify all of them.

Figure 4:
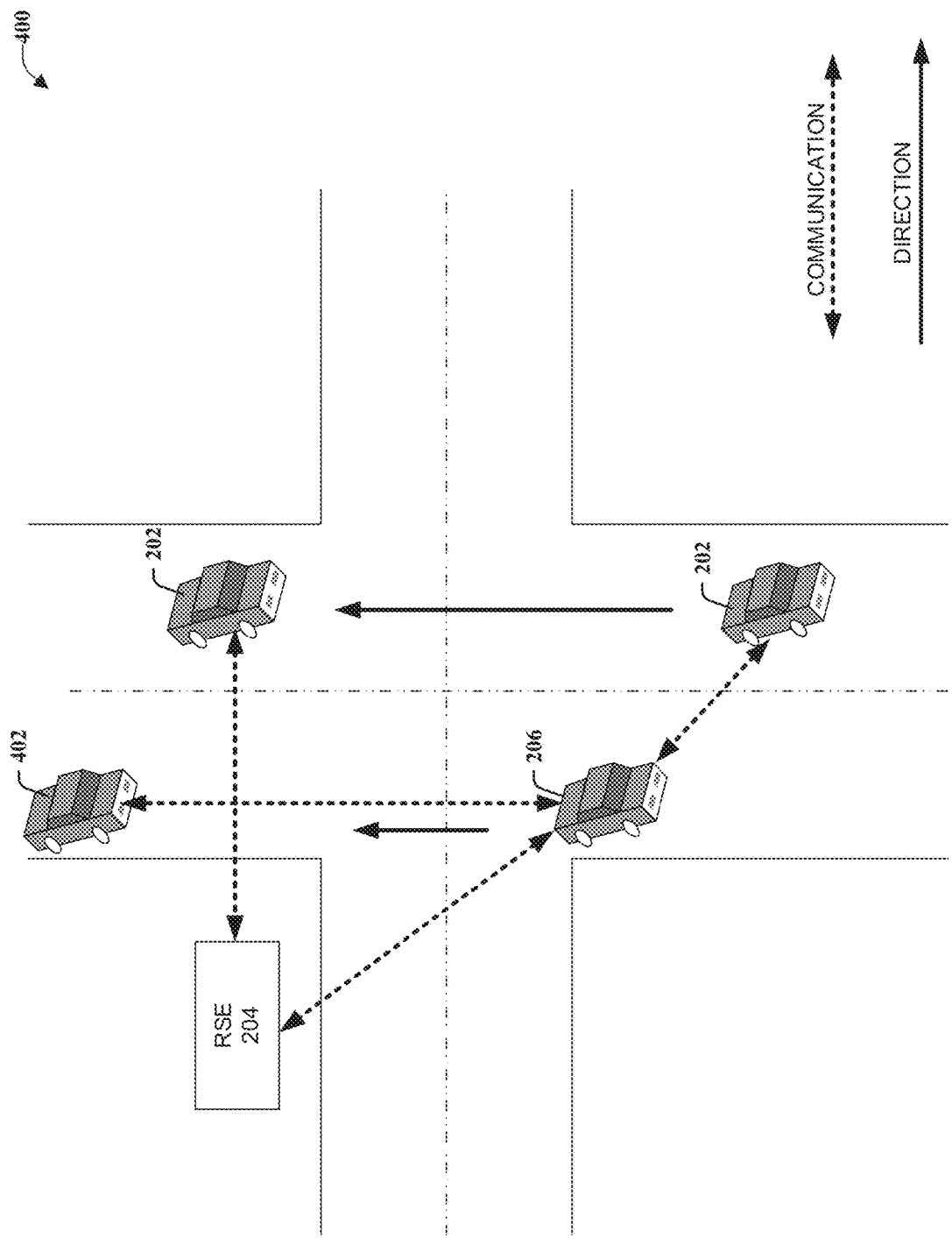
FIG. 4 illustrates is an example authentication management system according to one or more embodiments.

Referring now to FIG. 4, illustrated is an example authentication management system 400 according to one or more embodiments. As depicted in FIG. 4, an initial communication can occur between the vehicle node 202 and the vehicle node 206. Thus, a 2-way authentication (e.g., TLS) handshake and verification can take place between the vehicles, each with its own digital certificate.

If the vehicle node 206 is faster than the vehicle node 202, then to shorten the authentication time between the vehicle node 202 and the RSE 204, when the vehicle node 206 is in the service range of the RSE 204, the vehicle node 206 can provide information (e.g., authentication data) of the vehicle node 202 before the vehicle node 202 reaches the coverage area of the RSE 204 and the vehicle node 402) to the RSE 204 and a vehicle node 402. Consequently, the vehicle node 202 can begin communicating with the RSE 204 more quickly than a standard authentication process. Therefore, the vehicle node 206 can know that the RSE 204 can be the next hub that the vehicle node 202 encounters by measuring the vehicle node's 202 direction, speed, and/or perceived traffic conditions in addition to street information. When there are multiple routes available for the vehicle node 202, multiple potential RSEs, and other vehicle nodes, then the vehicle node 206 can notify all of them or a subset of them.

Since the vehicle node 202 can encounter multiple nodes in the near future, it should also be noted that the vehicle node 202 can propagate different encryption keys to the other nodes. Thus, when the vehicle node 202 arrives, it can already be authenticated with the other nodes. It should also be noted that in some cases nodes can be removed from the list of nodes to send data and/or propagate data to. For instance, if a node is determined to be a faulty node, then this node can be removed for propagation procedures.

Figure 5:
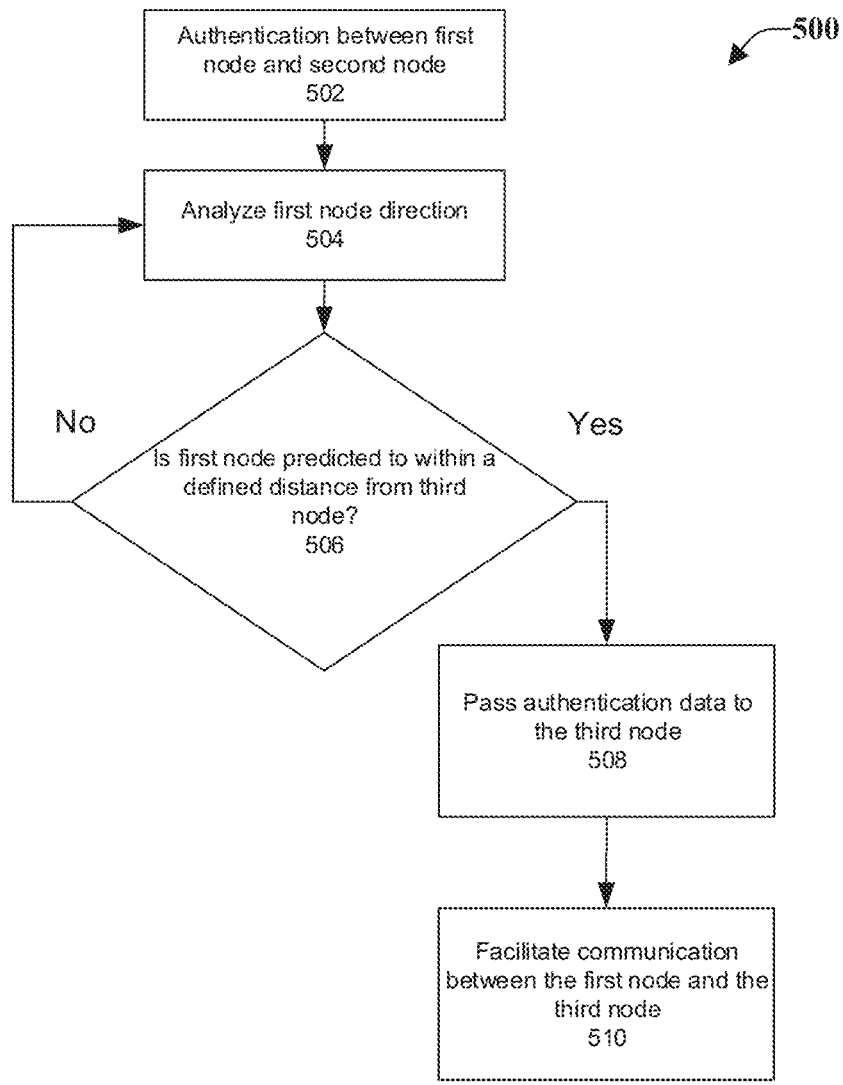
FIG. 5 illustrates an example schematic system block diagram of an authentication procedure according to one or more embodiments.

Referring now to FIG. 5, illustrated is a flow diagram of an authentication procedure 500 according to one or more embodiments. At block 502, an authentication between a first node (e.g., the vehicle node 202) and a second node (e.g., the RSE 204) can occur. The second node (e.g., the RSE 204) can then analyze data (e.g., direction, speed, time of day, historical values, messages from the first node, etc.) associated with the first node (e.g., the vehicle node 202) at block 504. Based on the analysis performed by the second node (e.g., the RSE 204), the second node (e.g., the RSE 204) can predict if the first node (e.g., the vehicle node 202) will be within a defined distance from a third node (e.g., the vehicle node 206) at 506. If the second node (e.g., the RSE 204) predicts that the first node (e.g., the vehicle node 202) will be within the defined distance of the third node (e.g., the vehicle node 206) at a specific time, then the second node (e.g., the RSE 204) can forward authentication data and/or encryption keys to the third node (e.g., the vehicle node 206) at block 508 such that the first node can be authenticated with the third node (e.g., the vehicle node 206) prior to the first node (e.g., the vehicle node 202) arriving at the defined distance of the third node (e.g., the vehicle node 206) at block 510. Alternatively, if the first node (e.g., the vehicle node 202) is not predicted to be in a defined distance of the third node (e.g., the vehicle node 206), then the system can recursively analyze the first node's (e.g., the vehicle node 202) direction at block 504.

Figure 6:
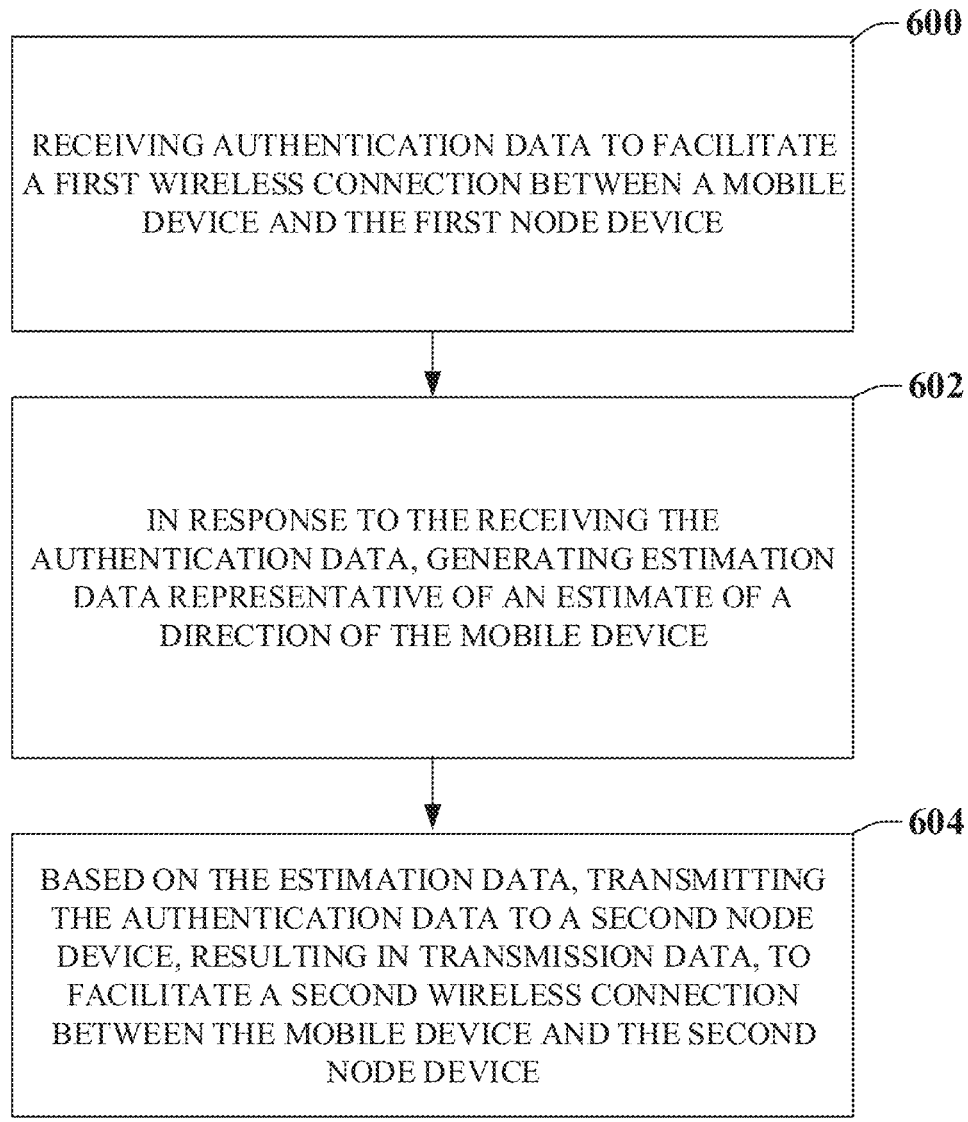
FIG. 6 illustrates an example flow diagram for a method for authentication management according to one or more embodiments.

Referring now to FIG. 6, illustrated is an example flow diagram for a method for authentication management according to one or more embodiments. At element 600, the method can comprise receiving authentication data to facilitate a first wireless connection between a mobile device (e.g., the vehicle node 202) and a first node device (e.g., the RSE 204). In response to the receiving the authentication data, the method can comprise generating estimation data representative of an estimate of a direction of the mobile device (e.g., the vehicle node 202) at element 602. Additionally, based on the estimation data, the method can comprise transmitting the authentication data to a second node device (e.g., the vehicle node 206) at element 604, resulting in transmission data, to facilitate a second wireless connection between the mobile device (e.g., the vehicle node 202) and the second node device (e.g., the vehicle node 206).

Figure 7:
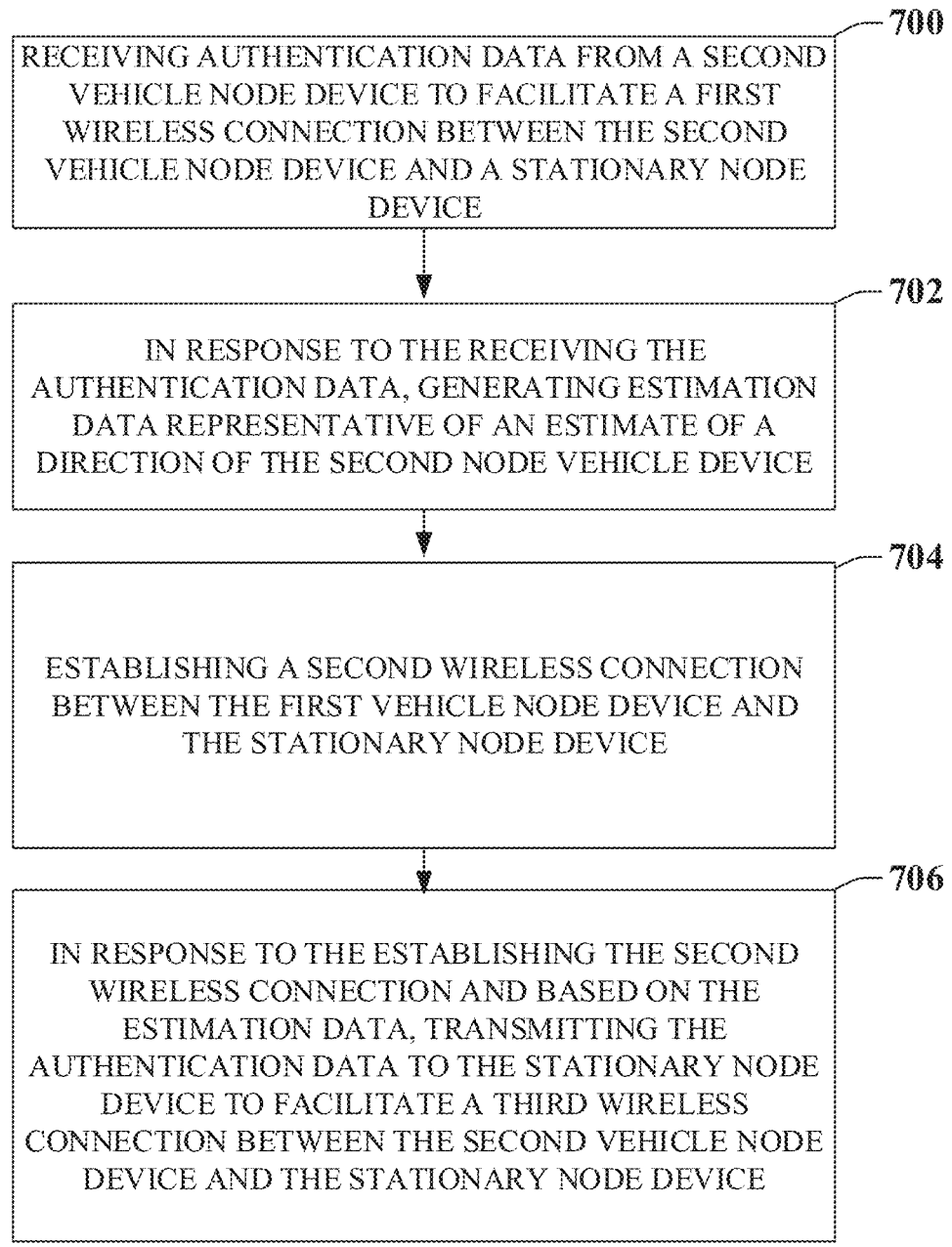
FIG. 7 illustrates an example flow diagram for a first vehicle node device for authentication management according to one or more embodiments.

Referring now to FIG. 7, illustrated is an example flow diagram for a first vehicle node device for authentication management according to one or more embodiments. At element 700, the first vehicle node device can facilitate receiving authentication data from a second vehicle node device (e.g., the vehicle node 206) to facilitate a first wireless connection between the second vehicle node device (e.g., the vehicle node 206) and a stationary node device (e.g., the RSE 204). In response to the receiving the authentication data, the first vehicle node device can facilitate generating estimation data representative of an estimate of a direction of the second node vehicle device (e.g., the vehicle node 206) at element 702. At element 704, the first vehicle node device can comprise establishing a second wireless connection between the first vehicle node device (e.g., the vehicle node 206) and the stationary node device (e.g., the RSE 204). Additionally, at element 706, in response to the establishing the second wireless connection and based on the estimation data, the first vehicle node device can comprise transmitting the authentication data to the stationary node device (e.g., the RSE 204) to facilitate a third wireless connection between the second vehicle node device (e.g., the vehicle node 206) and the stationary node device (e.g., the RSE 204).

Figure 8:
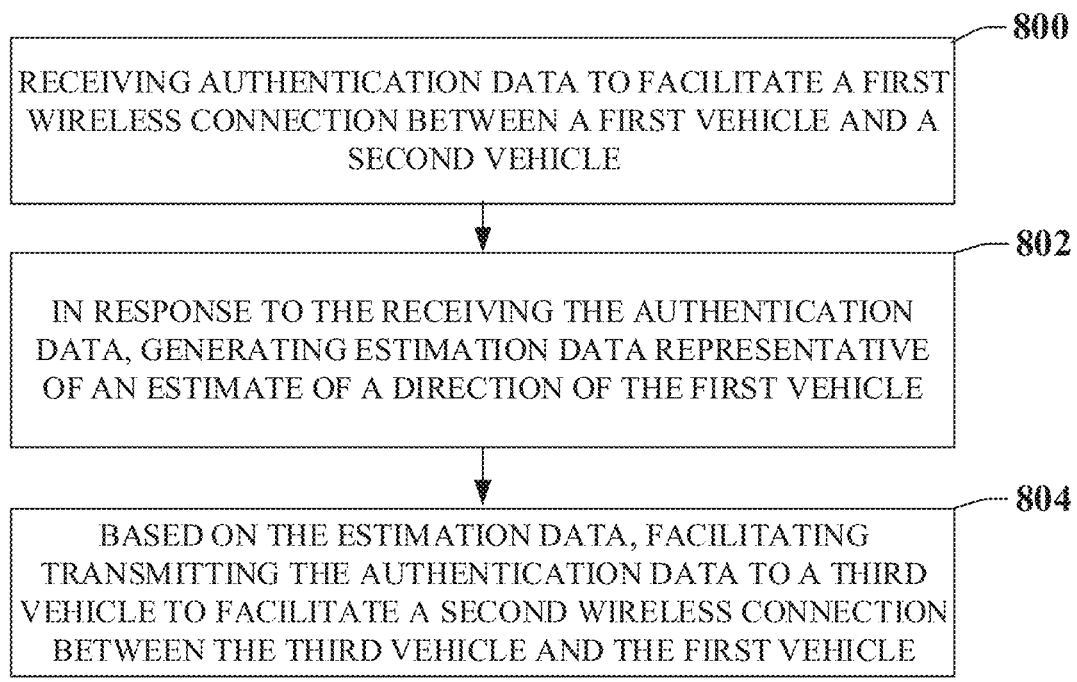
FIG. 8 illustrates an example flow diagram for a machine-readable medium for authentication management according to one or more embodiments.

Referring now to FIG. 8, illustrated is an example flow diagram for a machine-readable medium for authentication management according to one or more embodiments. At element 800, the machine-readable storage medium can perform the operations comprising receiving authentication data to facilitate a first wireless connection between a first vehicle (e.g., the vehicle node 206) and a second vehicle (e.g., the vehicle node 206). At element 802, the machine-readable storage medium can perform the operations comprising, generating estimation data representative of an estimate of a direction of the first vehicle (e.g., the vehicle node 206) in response to the receiving the authentication data. Additionally, based on the estimation data, at element 804, the machine-readable storage medium can perform the operations comprising facilitating transmitting the authentication data to a third vehicle (e.g., the vehicle node 402) to facilitate a second wireless connection between the third vehicle (e.g., the vehicle node 402) and the first vehicle (e.g., the vehicle node 206).

Figure 9:
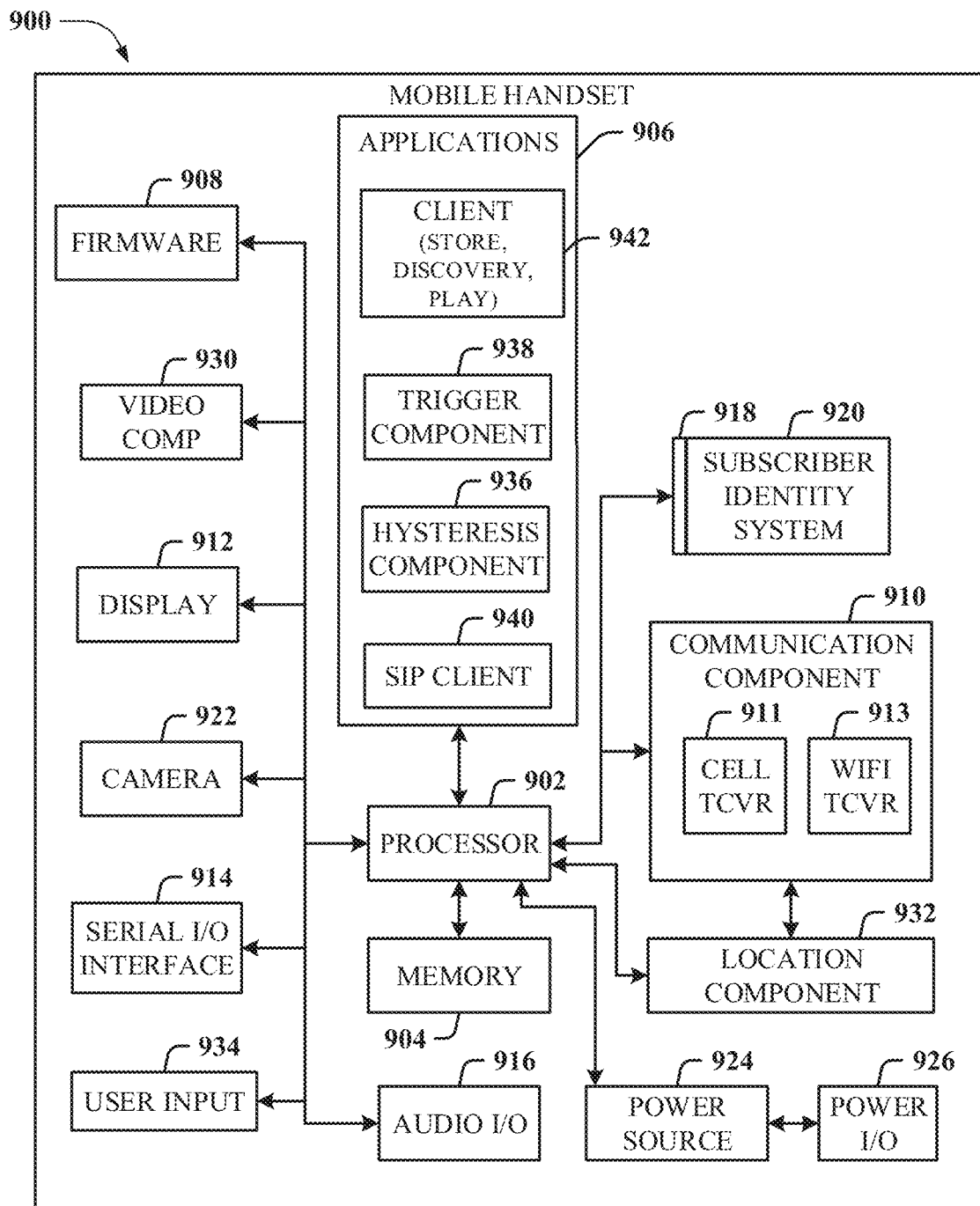
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
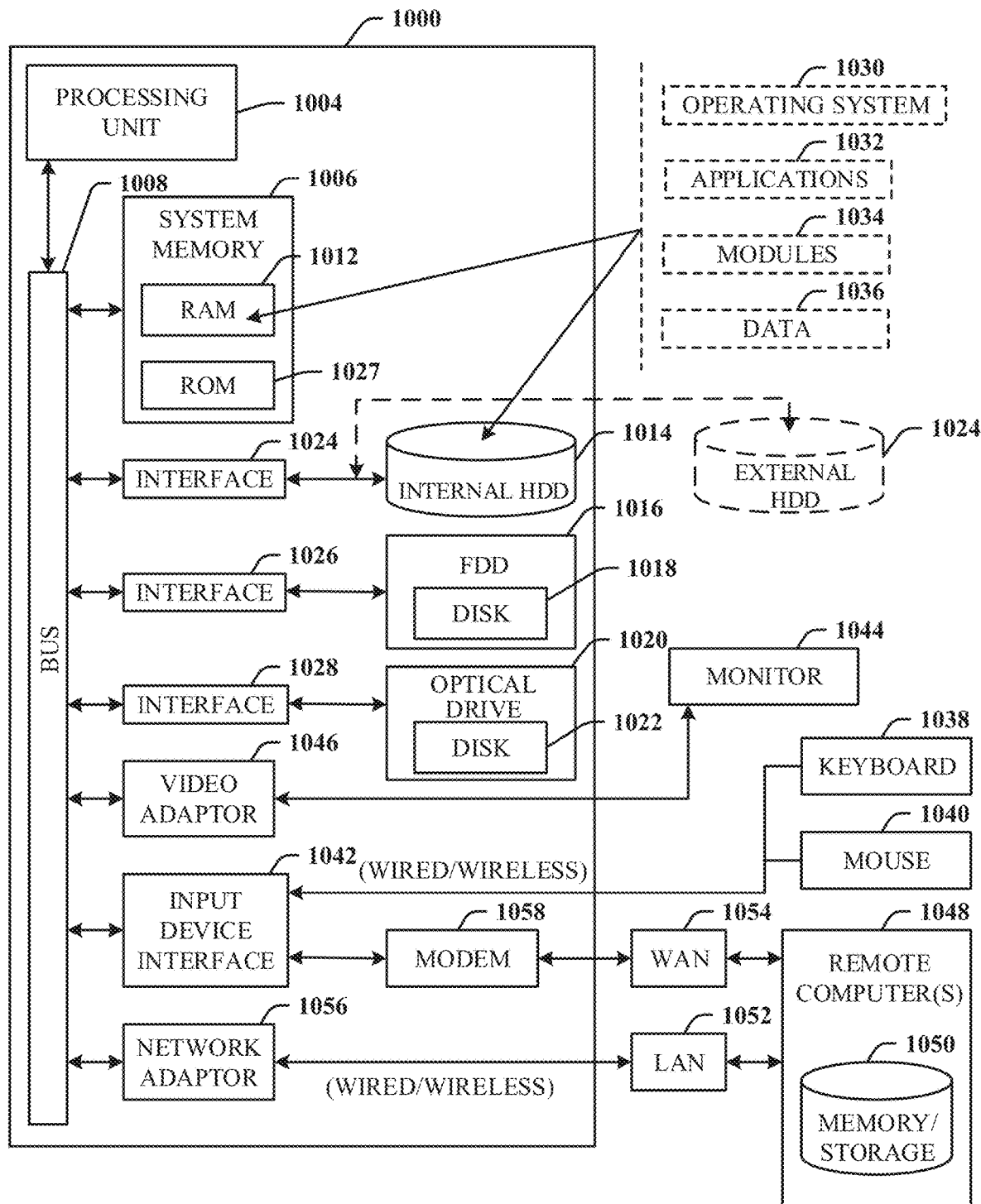
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at a 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   in response to receiving a first encryption key from a mobile device, generating, by a first node device comprising a processor, estimation data representative of an estimate of a direction of travel of the mobile device, wherein the estimation data is based on the direction of travel of the mobile device in relation to a geometry associated with a street via which the mobile device is traveling, and wherein the first encryption key facilitates first authentication applicable to establishing a first secured wireless connection between the mobile device and the first node device; and
   based on the estimation data, transmitting, by the first node device, a second encryption key to a second node device prior to the mobile device being within a wireless connection distance of the second node device, wherein the second encryption key facilitates second authentication applicable to establishing a second secured wireless connection between the mobile device and the second node device.

2. The method of claim 1, wherein the wireless connection distance of the second node device is associated with a wireless coverage area of the second node device.

3. The method of claim 1, further comprising:
   prior to the mobile device being within the wireless connection distance of the second node device, transmitting, by the first node device, a third encryption key to the second node device to facilitate third authentication applicable to establishing a third secured wireless connection between the first node device and the second node device.

4. The method of claim 1, further comprising:
   estimating, by the first node device, the direction of travel of the mobile device based on a speed associated with the mobile device and the direction of travel of the mobile device in relation to the geometry associated with the street via which the mobile device is traveling, wherein the generating of the estimation data comprises generating the estimation data based on the estimating of the direction of travel of the mobile device.

5. The method of claim 1, further comprising:
   estimating, by the first node device, the direction of travel of the mobile device based on a vehicle traffic condition associated with the mobile device and the direction of travel of the mobile device in relation to the geometry associated with the street via which the mobile device is traveling, wherein the generating of the estimation data comprises generating the estimation data based on the estimating of the direction of travel of the mobile device.

6. The method of claim 1, further comprising:
   predicting, by the first node device, that the mobile device is going to be within the wireless connection distance of the second node device at a defined time based on a speed of the mobile device, a vehicle traffic condition associated with the mobile device, or the direction of travel of the mobile device in relation to the geometry associated with the street via which the mobile device is traveling, wherein the generating of the estimation data comprises generating the estimation data based on the predicting.

7. The method of claim 1, further comprising:
based on the estimation data, determining, by the first node device, that a third node device is on a path of the direction of travel of the mobile device.

8. The method of claim 7, wherein the transmitting comprises transmitting a third encryption key to the third node device, concurrently with transmitting the second encryption key to the second node device, based on the third node device being determined to be on the path of the direction of travel of the mobile device.

9. The method of claim 1, further comprising:
generating, by the first node device, the second encryption key based on authentication data received from the mobile device; or
receiving, by the first node device, the second encryption key from the mobile device.

10. A first node device, comprising:
a processor, and
a memory that stores executable instructions that, when executed by the processor, facilitate performance of operations, comprising:
in response to receiving a first encryption key from a mobile device, generating prediction data representative of a prediction of a second direction of the mobile device, wherein the prediction data is based on a first direction of the mobile device in relation to a geometry associated with a road via which the mobile device is traveling, and wherein the first encryption key facilitates a first authentication to enable a first secured network connection to be established between the mobile device and the first node device; and
based on the prediction data, transmitting a second encryption key to a second node device prior to the mobile device being within a network connection distance of the second node device to facilitate a second authentication to enable a second secured network connection to be established between the mobile device and the second node device.

11. The first node device of claim 10, wherein the network connection distance of the second node device is associated with a network coverage area of the second node device, and wherein the second secured network connection between the mobile device and the second node device is able to be established based on the mobile device being within the network coverage area.

12. The first node device of claim 10, wherein the operations further comprise:
prior to the transmitting of the second encryption key to the second node device, transmitting a third encryption key to the second node device to facilitate a third authentication to enable a third secured network connection to be established between the first node device and the second node device, wherein the third authentication is a two-way authentication between the first node device and the second node device.

13. The first node device of claim 10, wherein the operations further comprise:
prior to the mobile device being within the network connection distance of the second node device, predicting the second direction of the mobile device and that the mobile device will be within the network connection distance of the second node device at a defined time based on a speed determined for the mobile device and the first direction of travel of the mobile device in relation to the geometry associated with the road via which the mobile device is traveling, wherein the generating of the prediction data comprises generating the prediction data based on the predicting of the second direction of the mobile device and that the mobile device will be within the network connection distance of the second node device at the defined time.

14. The first node device of claim 10, wherein the operations further comprise:
predicting the second direction of the mobile device and that the mobile device will be within the network connection distance of the second node device at a defined time based on a speed determined for the mobile device, a vehicle traffic condition determined to be associated with the mobile device, or the first direction of travel of the mobile device in relation to the geometry associated with the road via which the mobile device is traveling, wherein the generating of the prediction data comprises generating the prediction data based on the predicting that the mobile device will be within the network connection distance of the second node device at the defined time.

15. The first node device of claim 10, wherein the first node device is, or is associated with, roadside equipment.

16. The first node device of claim 10, wherein the first node device is a first mobile device, wherein the mobile device is a second mobile device, and wherein the operations further comprise:
determining that a third node device is on a path of the second direction of the second mobile device.

17. The first node device of claim 16, wherein the operations further comprise:
in response to a third secured network connection being established between the first mobile device and the third node device, transmitting a third encryption key to the third node device to facilitate a third authentication to enable a fourth secured network connection to be established between the second mobile device and the third node device.

18. The first node device of claim 10, wherein the operations further comprise:
creating the second encryption key based on authentication information received from the mobile device; or
receiving the second encryption key from the mobile device.

19. A non-transitory machine-readable medium, comprising executable instructions that, when executed by a processor of first node equipment, facilitate performance of operations, comprising:
in response to receiving a first encryption key from a user equipment, determining estimation information representative of an estimate of a direction of travel of the user equipment, wherein the estimation information is based on the direction of travel of the user equipment in relation to a geometry associated with a route via which the user equipment is traveling, and wherein the first encryption key facilitates a first authentication for establishment of a first secured wireless connection between the user equipment and the first node equipment; and
based on the estimation information, communicating a second encryption key to second node equipment prior to the user equipment being within a wireless connection distance of the second node equipment, wherein the second encryption key facilitates a second authentication for establishment of a second secured wireless connection between the user equipment and the second node equipment, and wherein the second encryption key is different from the first encryption key.

20. The non-transitory machine-readable medium of claim 19, wherein the wireless connection distance of the second node equipment is associated with a wireless coverage area of the second node equipment, and wherein the operations further comprise:

based on a velocity associated with the user equipment, a vehicle traffic condition associated with the user equipment, or the direction of travel of the user equipment in relation to the geometry associated with the route via which the user equipment is traveling, estimating that the user equipment is going to be within the wireless connection distance of the second node equipment at a time, resulting in an estimated time, wherein the determining of the estimation information comprises determining the estimation information based on the estimated time.

\* \* \* \* \*